United States Patent
Hong

(10) Patent No.: US 12,484,095 B2
(45) Date of Patent: Nov. 25, 2025

(54) CONNECTION CONTROL METHOD AND CONNECTION CONTROL APPARATUS

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 366 days.

(21) Appl. No.: 18/044,173

(22) PCT Filed: Sep. 11, 2020

(86) PCT No.: PCT/CN2020/114901
§ 371 (c)(1),
(2) Date: Mar. 6, 2023

(87) PCT Pub. No.: WO2022/052070
PCT Pub. Date: Mar. 17, 2022

(65) Prior Publication Data
US 2023/0328808 A1    Oct. 12, 2023

(51) Int. Cl.
*H04W 76/10* (2018.01)
*H04W 76/30* (2018.01)
*H04W 88/06* (2009.01)

(52) U.S. Cl.
CPC ........... *H04W 76/10* (2018.02); *H04W 76/30* (2018.02); *H04W 88/06* (2013.01)

(58) Field of Classification Search
CPC ..... H04W 76/10; H04W 76/30; H04W 88/06; H04W 76/15; H04W 76/27; H04W 76/34;
(Continued)

(56) References Cited

U.S. PATENT DOCUMENTS

2017/0325278 A1    11/2017 Ramkumar et al.
2018/0176976 A1*    6/2018 Liu ............... H04W 76/18
(Continued)

FOREIGN PATENT DOCUMENTS

CN    106255226 A    12/2016

OTHER PUBLICATIONS

Notice for the first trial issued by State Intellectual Property Rights Bureau on Oct. 31, 2024, in corresponding Application No. CN 202080002219.9, 7 pages.
(Continued)

*Primary Examiner* — Hirdepal Singh
(74) *Attorney, Agent, or Firm* — Finnegan, Henderson, Farabow, Garrett & Dunner, L.L.P.

(57) ABSTRACT

A method for connection control is performed by a terminal provided with a first Subscriber Identity Module (SIM) card and a second SIM card, and the method includes: determining that a communication connection with a second network-side device is established by the second SIM card during communication between the first SIM card and a first network-side device, wherein the second network-side device is same as or different from the first network-side device; and sending request information to the second network-side device by the second SIM card, wherein the request information is configured to adjust the first SIM card from a connected state to a non-connected state.

20 Claims, 10 Drawing Sheets

--- determining that a communication connection with a second network-side device is established by the second SIM card during communication between the first SIM card and a first network-side device, in which the second network-side device is same as or different from the first network-side device — S101 sending the request information to a second base station through a fifth message in a random access process, in which the second network-side device is the second base station — S201

(58) Field of Classification Search
CPC ..... H04W 8/183; H04W 12/45; H04W 24/10; H04W 28/0215; H04W 28/18; H04W 36/0069; H04W 48/17; H04W 60/005; H04W 72/0453; H04W 72/54; H04L 1/0025; H04L 1/0026
USPC ..................................................... 455/422.1
See application file for complete search history.

(56) References Cited

U.S. PATENT DOCUMENTS

| | | | |
|---|---|---|---|
| 2021/0105738 A1* | 4/2021 | Bendlin | H04W 8/24 |
| 2023/0128087 A1* | 4/2023 | Wang | H04W 8/183 |
| | | | 455/422.1 |
| 2023/0345332 A1* | 10/2023 | Wang | H04W 36/144 |
| 2024/0015620 A1* | 1/2024 | Quan | H04W 36/36 |

OTHER PUBLICATIONS

European Patent Office, Extended European Search Report issued in Application No. 20952858.7, dated Sep. 28, 2023, 9 pages.

* cited by examiner

CONNECTION CONTROL METHOD AND CONNECTION CONTROL APPARATUS

CROSS-REFERENCE TO RELATED APPLICATION

This application is the U.S. national phase of International Application No. PCT/CN2020/114901, filed on Sep. 11, 2020, the entire content of which is incorporated herein by reference.

TECHNICAL FIELD

The disclosure relates to a field of communication technologies, and specifically to a method for connection control, an apparatus for connection control, an electronic device and a computer-readable storage medium.

BACKGROUND

In a multi-card terminal, a terminal may perform communication using more than one subscriber identity module (SIM) card, while a communication conflict may occur between the more than one SIM card during the communication process. For example, it is determined that communication with a second base station may be performed by means of a second SIM card during communication with a first base station by means of a first SIM card.

In order to ensure that the second SIM card may communicate with the second base station smoothly, the first SIM card may request the first base station to disconnect the communication connection. However, in some cases, the first base station disconnects the communication connection with the first SIM card before the second SIM card establishes a communication connection with the second base station, which results in that neither the first SIM card nor the second SIM card in the terminal has a communication connection with the base station.

SUMMARY

According to a first aspect of embodiments of the present disclosure, a method for connection control is provided. The method is performed by a terminal. The terminal is at least provided with a first SIM card and a second SIM card. The method includes:
  determining that a communication connection with a second network-side device is established by the second SIM card during communication between the first SIM card and a first network-side device, in which, the second network-side device is same as or different from the first network-side device; and
  sending request information to the second network-side device by the second SIM card, in which the request information is configured to adjust the first SIM card from a connected state to a non-connected state.

According to a second aspect of embodiments of the present disclosure, a method for connection control is provided, and the method is performed by a first network-side device. The method includes:
  receiving request information sent when a second network-side device establishes a communication connection with a second SIM card in a terminal, in which, the request information is configured to request the first network-side device to adjust a first SIM card in the terminal in communication with the first network-side device from a connected state to a non-connected state; and
  sending a connection release signaling to the first SIM card.

According to a third aspect of embodiments of the present disclosure, a method for connection control is provided, and the method is performed by a second network-side device. The method includes:
  receiving request information sent by a second SIM card in a terminal, in which, the request information is configured to request a first network-side device to adjust a first SIM card from a connected state to a non-connected state; and
  sending the request information to the first network-side device.

According to a fourth aspect of embodiments of the present disclosure, an electronic device is provided, and includes:
  a processor; and
  a memory configured to store instructions executable by the processor;
  the processor is configured to implement the above method.

According to an fifth aspect of embodiments of the present disclosure, a computer-readable storage medium with a computer program stored thereon is provided. The program implements steps of the above method when executed by a processor.

BRIEF DESCRIPTION OF THE DRAWINGS

In order to explain the technical solutions in embodiments of the present disclosure more clearly, the drawings may be used in the description of the embodiments will be briefly introduced below. Obviously, the drawings in the description below are only part of embodiments of the present disclosure, and for those skilled in the art, other drawings can be obtained according to these drawings without creative work.

DETAILED DESCRIPTION

The technical solution of the embodiments of the present disclosure will be described clearly and completely with reference to the accompanying drawings that may be used in the description of the embodiments. Obviously, the embodiments described are only a part of the embodiments of the present disclosure, and are not all the embodiments. On the basis of the embodiments of the present disclosure, other embodiments obtained by those skilled in the art without creative work are within the protection scope of the present disclosure.

Figure 1:
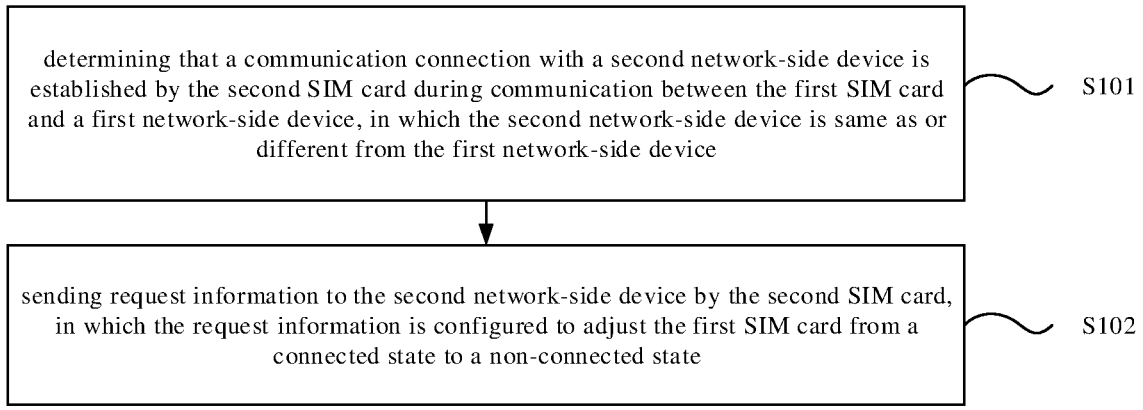
FIG. 1 is a flowchart illustrating a method for connection control according to an embodiment of the present disclosure.

FIG. 1 is a flowchart illustrating a method for connection control according to an embodiment of the present disclosure. The method for connection control as illustrated in the embodiment may be performed by a terminal. The terminal includes, but is not limited to, electronic devices such as a mobile phone, a tablet computer, a wearable device, a sensor, an Internet of things device. The terminal may communicate, as a user equipment (UE), with a network-side device. For example, the network-side device may be a base station or a core network. The base station includes, but is not limited to, a 4G base station, a 5G base station or a 6G base station. In an embodiment, the network-side device may be a network-side device for performing the method for connection control as described in any subsequent embodiments.

The terminal may be a multi-card terminal, that is, more than one Subscriber Identity Module (SIM) card may be configured in the terminal. The more than one SIM card at least includes a first SIM card and a second SIM card. The first SIM card and the second SIM card may belong to the same operator network or different operator networks. When the first SIM card and the second SIM card belong to different operator networks, a first network-side device that establishes a communication connection with the first SIM card is different from a second network-side device that establishes a communication connection with the second SIM card. When the first SIM card and the second SIM card belong to the same operator network, the first network-side device that establishes the communication connection with the first SIM card may be same as or different from the second network-side device that establishes the communication connection with the second SIM card.

As illustrated in FIG. 1, the method for connection control includes the following steps.

At step S101, it is determined that a communication connection with a second network-side device is established by the second SIM card during communication between the first SIM card and a first network-side device. The second network-side device is same as or different from the first network-side device.

At step S102, request information is sent to the second network-side device by the second SIM card. The request information is configured to adjust the first SIM card from a connected state to a non-connected state.

In an embodiment, when it is determined that the communication with the second network-side device is performed by the second SIM card during the communication between the first SIM card and the first network-side device, the second SIM card is used to establish the communication connection with the second network-side device.

For example, during the communication between the first SIM card and a first base station, the second SIM card receives a paging message sent by a second base station, and the terminal determines that the paging message may be responded by the second SIM card. For example, it is determined that random access may be initiated to the second base station by the second SIM card, then the second SIM card is used to establish the communication connection with the second network-side device.

In the related art, the first SIM card may request the first base station to disconnect a communication connection with the first SIM card, to ensure that the second SIM card may establish the communication connection with the second base station smoothly.

However, in some cases, the second SIM card cannot establish a communication connection with the second base station successfully for a long time, or the second SIM card fails to establish a communication connection with the second base station. For example, that the second SIM card establishes the communication connection with the second network-side device may be that the second SIM card initiates a random access request to the second base station based on a received paging message. However, a random access contention fails, thereby the second SIM card fails to establish the communication connection with the second base station.

In this way, the communication connection between the first SIM card and the first base station is disconnected, and the second SIM card fails to establish a communication connection with the second base station, so that the terminal interrupts a communication from the base station, which affects a communication efficiency.

According to embodiments of the present disclosure, the second SIM card may send the request information to the second network-side device, so that the second network-side device is requested to adjust the first SIM card from the connected state to the non-connected state based on the request information sent by the second SIM card when the second SIM card establishes the communication connection with the second network-side device.

Accordingly, it may be ensured that the first SIM card is adjusted from the connected state to the non-connected state when the communication connection between the second SIM card and the second network-side device is successfully established, so that there is a communication connection between at least one SIM card in the terminal and a network-side device, thereby ensuring a communication efficiency of the terminal.

In an embodiment, when the first network-side device and the second network-side device are the same network-side device, the second network-side device may directly send a signaling to the first SIM card, to indicate that the first SIM card enters the non-connected state from the connected state.

In an embodiment, when the first network-side device and the second network-side device are different network-side devices, the second SIM card may send information of the first network-side device to the second network-side device, so that the second network-side device may determine the first network-side device, and further the second network-side device sends a request to the first network-side device, to request the first network-side device to send a signaling to the first SIM card, to indicate the first SIM card to enter the non-connected state from the connected state.

Optionally, the type of the non-connected state includes at least one of:

an idle state or an inactive state.

In an embodiment, based on different non-connected states entered by the first SIM card, there may be different signalings configured to indicate the terminal to enter the non-connected state. For example, a radio resource control (RRC) connection release signaling may be used to indicate the first SIM card to enter the idle state, and an RRC connection suspension release signaling may indicate that the first SIM card enters an inactive state.

Figure 2:
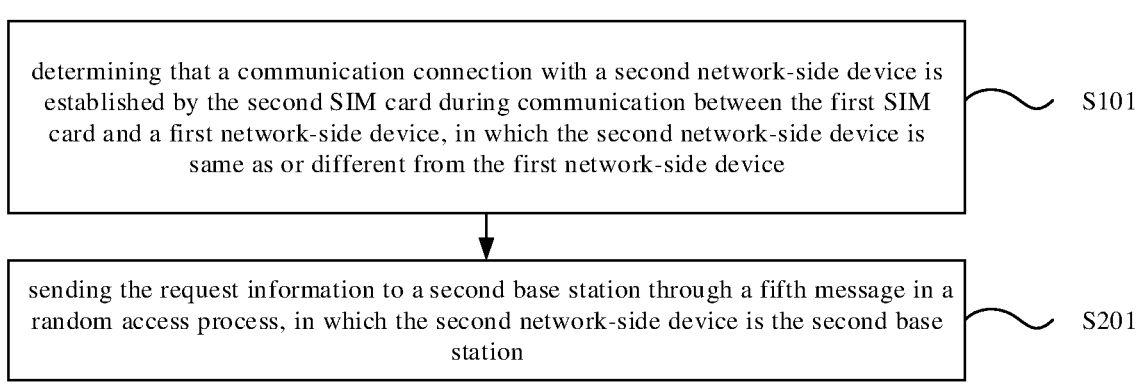
FIG. 2 is a flowchart illustrating a method for connection control according to another embodiment of the present disclosure.

FIG. 2 is a flowchart illustrating a method for connection control according to an embodiment of the present disclosure. As illustrated in FIG. 2, sending the request information to the second network-side device by the second SIM card includes:

At step S201, the request information is sent to a second base station through a fifth message in a random access process. The second network-side device is the second base station.

In an embodiment, when the second network-side device is the second base station, the second SIM card may initiate random access to the second base station, and further send the request information carried in the fifth message MSG5 of a random access process to the second base station. The MSG5 may be an RRC connection complete message. Accordingly, it is not necessary to send the request information to the second base station separately, which enhances a utilization rate of communication resources.

Figure 3:
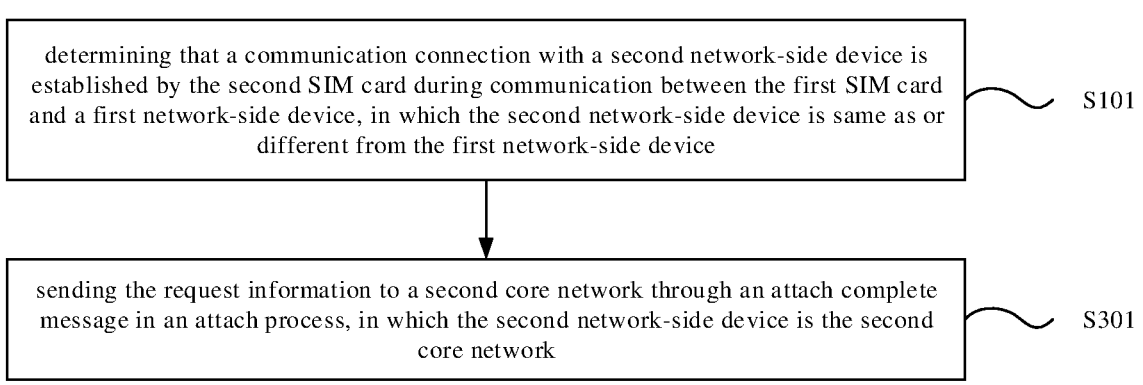
FIG. 3 is a flowchart illustrating a method for connection control according to another embodiment of the present disclosure.

FIG. 3 is a flowchart illustrating a method for connection control according to an embodiment of the present disclosure. As illustrated in FIG. 3, sending the request information to the second network-side device by the second SIM card includes:

At step S301, the request information is sent to a second core network through an attach complete message in an attach process. The second network-side device is the second core network.

In an embodiment, when the second network-side device is the second core network, the second SIM card may initiate an attach request to the second base station, and further send the request information carried in the attach complete message to the second base station after completing the attach. Accordingly, it is not necessary to send the request information to the second base station separately, which enhances a utilization rate of communication resources.

Optionally, the request information is further configured to indicate information of the first network-side device to the second network-side device.

In an embodiment, the request information may further include the information of the first network-side device such as an identity, a location and an interface type of the first network-side device, so that the second network-side device may determine the first network-side device based on the information of the first network-side device, and may further request the first network-side device to send a signaling to the first SIM card, to indicate the first SIM card to enter a non-connected state from a connected state.

For example, when the second network-side device is capable of establishing an interface with the first network-side device, the second network-side device may establish an interface with the first network-side device, and request information may be directly sent to the first network-side device through the interface. For example, when the second network-side device is incapable of establishing an interface with the first network-side device, the request information may be sent to a core network, and the core network forwards the request information to the first network-side device.

In an embodiment, when the first network-side device and the second network-side device are different network-side devices, the information of the first network-side device may be indicated to the second network-side device through the request information.

In an embodiment, the information of the first network-side device may be acquired by the first SIM card, and the information of the first network-side device is sent to the second SIM card by the first SIM card. Or, when the information of the first network-side device is acquired by the first SIM card, the information of the first network-side device may be stored in a processor of the terminal, and the second SIM card acquires the information of the first network-side device from the processor of the terminal.

Figure 4:
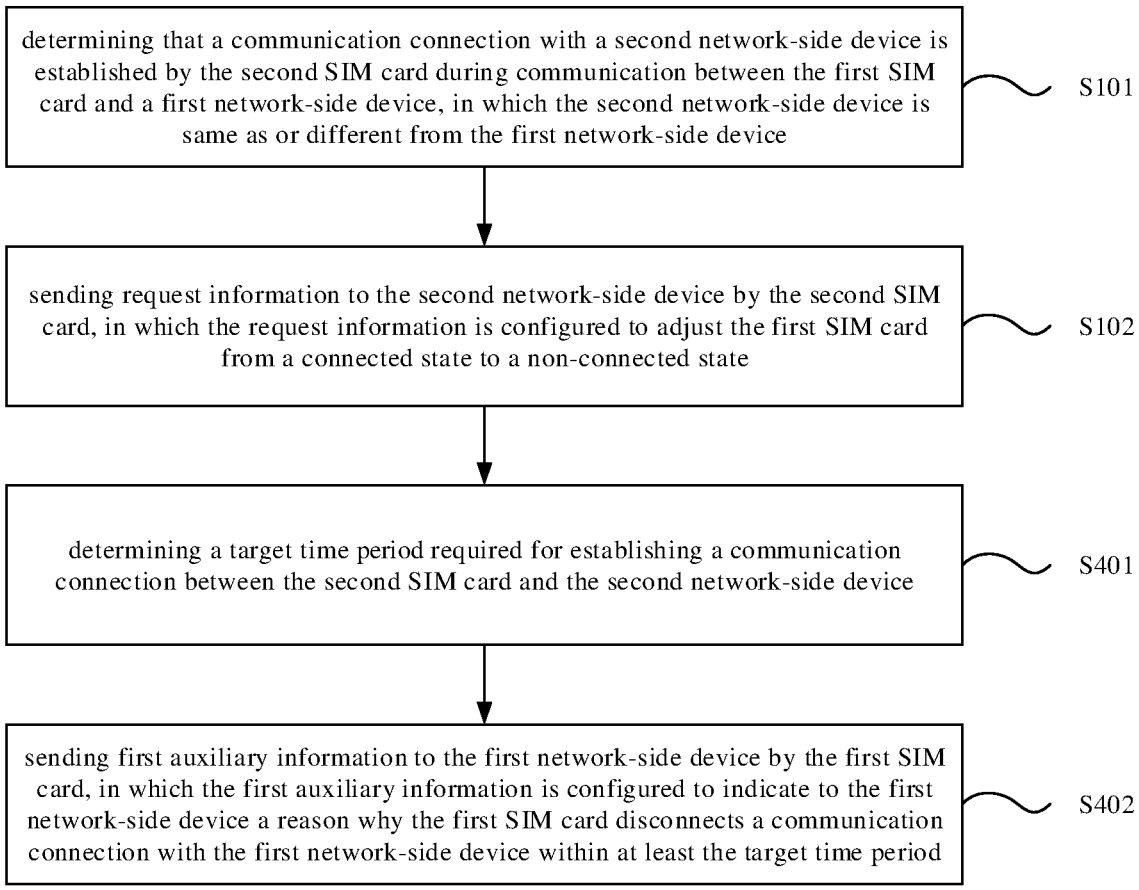
FIG. 4 is a flowchart illustrating a method for connection control according to another embodiment of the present disclosure.

FIG. 4 is a flowchart illustrating a method for connection control according to an embodiment of the present disclosure. As illustrated in FIG. 4, the method further includes:

At step S401, a target time period required for establishing a communication connection between the second SIM card and the second network-side device is determined, for example, predicted based on historical information.

At step S402, first auxiliary information is sent to the first network-side device by the first SIM card. The first auxiliary information is configured to indicate to the first network-side device a reason why the first SIM card disconnects a communication connection with the first network-side device within at least the target time period.

In an embodiment, within the target time period required for establishing the communication connection between the second SIM card and the second network-side device, that is, within a target time period from establishing the communication connection between the second network-side device and the second SIM card to completing establishment of the communication connection between the second SIM card and the second network-side device, the first SIM card may disconnect a communication connection with the first network-side device.

In the related art, when the first network-side device detects that the first SIM card disconnects the communication connection, it may be regarded as a communication problem (for example, a shadow effect). An action configured to solve the communication problem is adopted to improve a transmission power and a paging frequency, so that a communication connection is established again with the first SIM card. However, in this case, the first network-side device disconnects the communication connection is not due to the communication problem, but because that the first SIM card actively disconnects the communication connection with the first network-side device to ensure that the second SIM card establishes the communication connection with the second network-side device. Thus, the first network-side device cannot establish a communication connection with the first SIM card again within the target time period even if it adopts the action of increasing the transmission power or the paging frequency, thereby resulting in waste of resources of the first network-side device.

According to the embodiments of the present disclosure, in this case, the target time period required for establishing the communication connection between the second SIM card and the second network-side device may be determined, and then the first auxiliary information is sent to the first network-side device, to indicate to the first network-side device the reason why the first SIM card disconnects the communication connection with the first network-side device within at least the target time period based on the first auxiliary information. So that the first network-side device clearly determines that the first SIM card actively disconnects the communication connection with the first network-side device rather than due to the communication problem, thereby not performing the action of improving the transmitting power or improving the paging frequency that is configured to solve the communication problem, which avoids waste of resources of the first network-side device.

Figure 5:
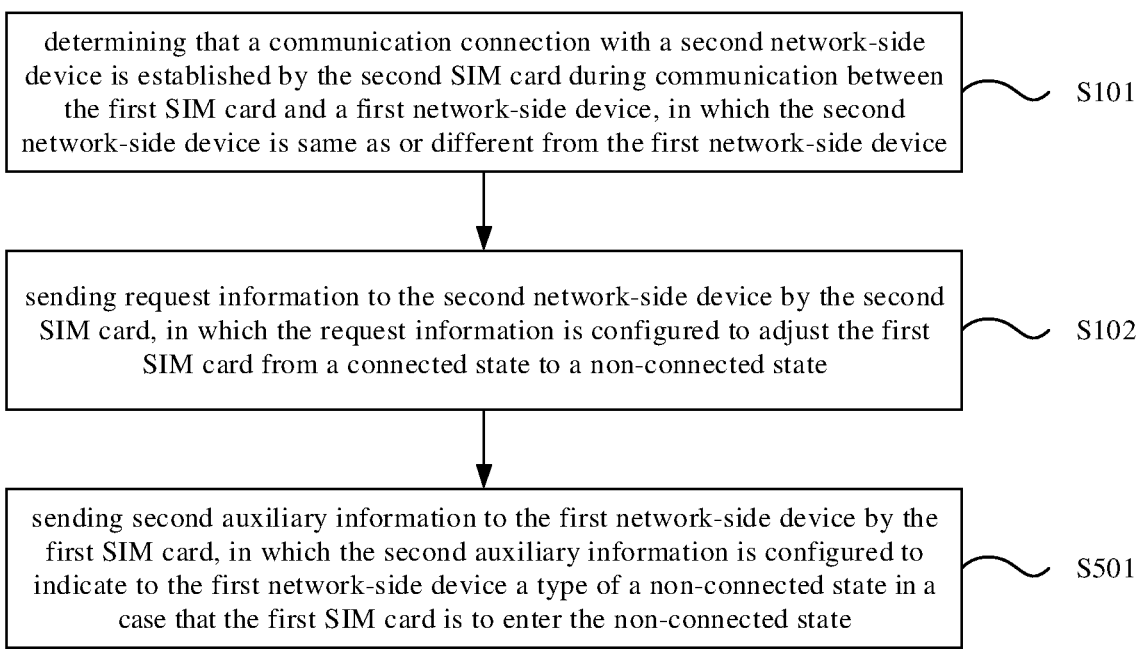
FIG. 5 is a flowchart illustrating a method for connection control according to another embodiment of the present disclosure.

FIG. 5 is a flowchart illustrating a method for connection control according to an embodiment of the present disclosure. As illustrated in FIG. 5, the method further includes:

At step S501, second auxiliary information is sent to the first network-side device by the first SIM card. The second auxiliary information is configured to indicate to the first network-side device a type of the non-connected state when the first SIM card is to enter the non-connected state.

In an embodiment, the first SIM card may further send the second auxiliary information to the first network-side device before disconnecting the communication connection with the first network-side device, and indicate to the first network-side device the type of the non-connected state when the first SIM card is to enter the non-connected state through the second auxiliary information. Accordingly, the first network-side device may send a signaling corresponding to the type of the non-connected state to the first SIM card, to indicate the first SIM card to enter the non-connected state that the first SIM card may enter.

For example, when the first network-side device determines that the type of the non-connected state that the first SIM card may enter is the idle state based on the second auxiliary information, an RRC connection release signaling may be sent to the first SIM card, so that the first SIM card enters the idle state. For example, the first network-side device determines that the type of the non-connected state that the first SIM card may enter is the inactive state based on the second auxiliary information, an RRC connection suspension release signaling may be sent to the first SIM card, so that the first SIM card enters the inactive state.

Figure 6:
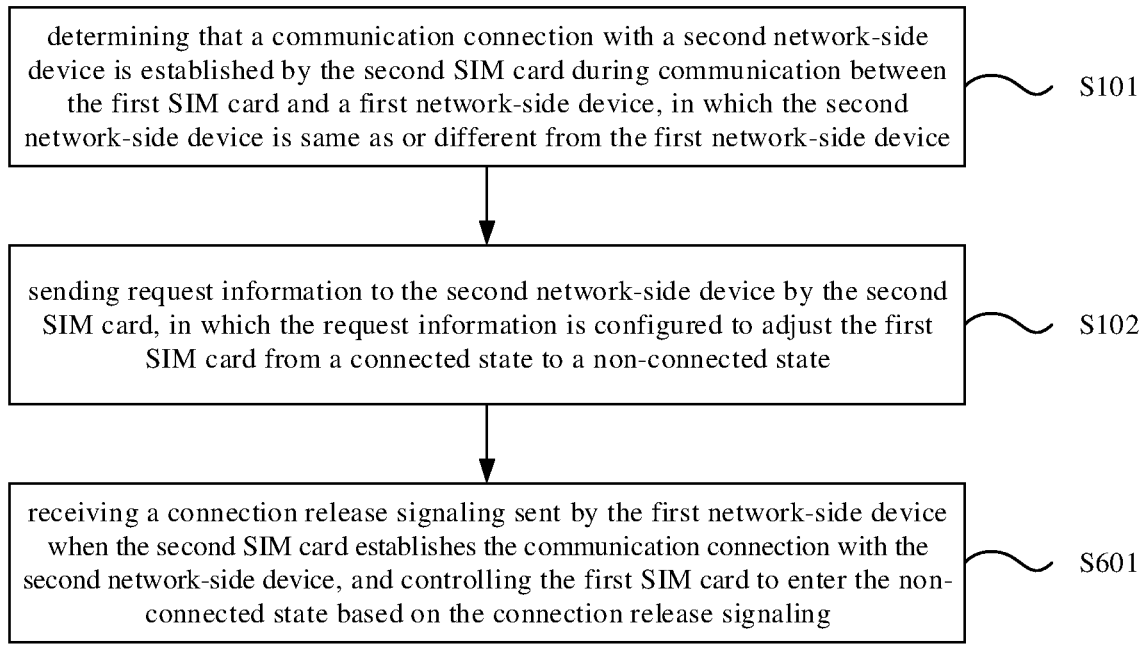
FIG. 6 is a flowchart illustrating a method for connection control according to another embodiment of the present disclosure.

FIG. 6 is a flowchart illustrating a method for connection control according to an embodiment of the present disclosure. As illustrated in FIG. 6, the method further includes:

At step S601, when the second SIM card establishes the communication connection with the second network-side device, a connection release signaling sent by the first network-side device is received, and the first SIM card is controlled to enter the non-connected state based on the connection release signaling.

In an embodiment, when the second SIM card establishes the communication connection with the second network-side device, the second SIM card may receive the connection release signaling sent by the first network-side device, and further control the first SIM card to enter the non-connected state based on the connection release signaling. It may be ensured that the first SIM card is adjusted from the connected state to the non-connected state after the communication connection between the second SIM card and the second network-side device is established, so that there is a communication connection between at least one SIM card in the terminal and a network-side device, thereby ensuring the communication efficiency of the terminal.

In an embodiment, the connection release signaling sent by the first network-side device may be directly received by the first SIM card from the first network-side device or may be received by the second SIM card from the first network-side device. For example, when the second SIM card establishes the communication connection with the second network-side device, the second network-side device may obtain the connection release signaling from the first network-side device, and then send the connection release signaling to the second SIM card, and further the second SIM card sends the connection release signaling to the first SIM card.

Figure 7:
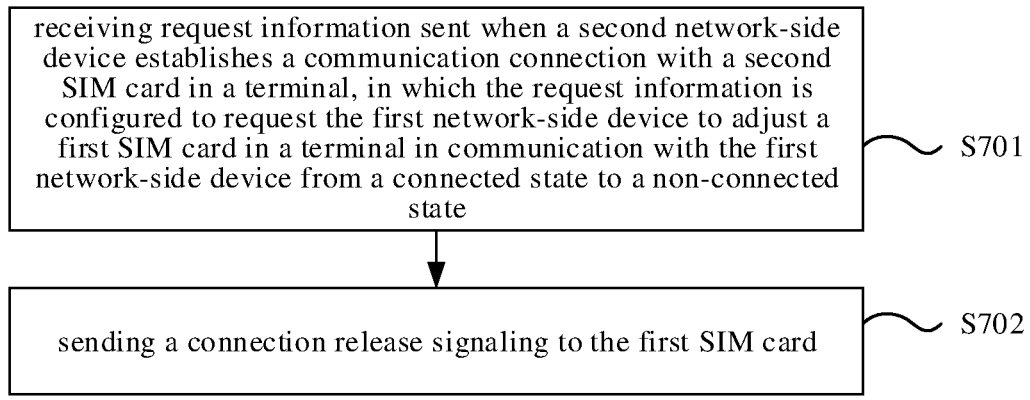
FIG. 7 is a flowchart illustrating a method for connection control according to an embodiment of the present disclosure.

FIG. 7 is a flowchart illustrating a method for connection control according to an embodiment of the present disclosure. The method for connection control as illustrated in embodiments may be performed by a first network-side device. The first network-side device may be a base station or a core network. The base station includes, but is not limited to, a 4G base station, a 5G base station or a 6G base station. The first network-side device may communicate with a terminal which acts as a user equipment. The terminal includes, but is not limited to, a mobile phone, a tablet computer, a wearable device, a sensor, an Internet of things device and other electronic devices. In an embodiment, the terminal may be a terminal that performs the method for connection control as described in any of the above embodiments.

As illustrated in FIG. 7, the method for connection control includes the following steps.

At step S701, request information sent when a second network-side device establishes a communication connection with a second SIM card in a terminal is received. The request information is configured to request the first network-side device to adjust a first SIM card in a terminal in communication with the first network-side device from a connected state to a non-connected state.

At step S702, a connection release signaling is sent to the first SIM card.

In an embodiment, when the second network-side device establishes the communication connection with the second SIM card sent in the terminal, the request information is sent to the first network-side device, to request the first network-side device to adjust the first SIM card in the terminal from the connected state to the non-connected state based on the request information, so that the first network-side device sends the connection release signaling to the first SIM card.

Accordingly, it may be ensured that the first SIM card is adjusted from the connected state to the non-connected state when the communication connection between the second SIM card and the second network-side device is successfully established, so that there is a communication connection between at least one SIM card in the terminal and a network-side device, thereby ensuring the communication efficiency of the terminal.

Figure 8:
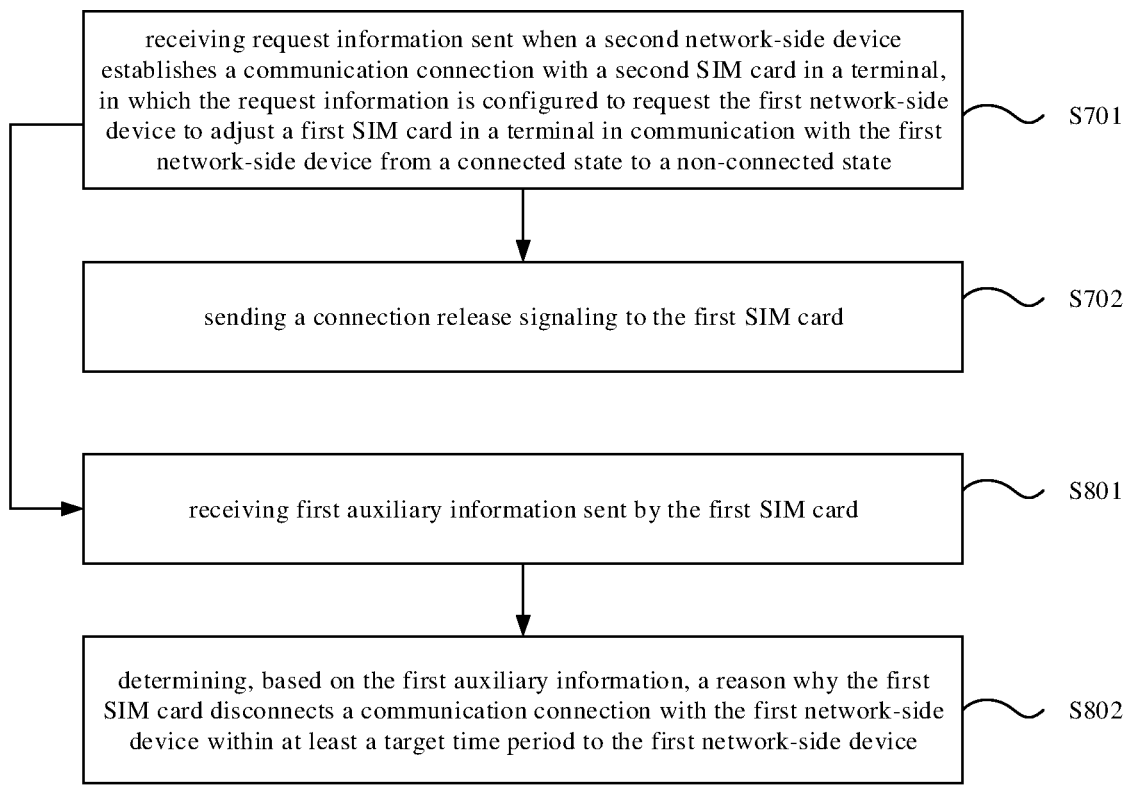
FIG. 8 is a flowchart illustrating a method for connection control according to another embodiment of the present disclosure.

FIG. 8 is a flowchart illustrating a method for connection control according to an embodiment of the present disclosure. As illustrated in FIG. 8, the method further includes:

At step S801, first auxiliary information sent by the first SIM card is received.

At step S802, a reason why the first SIM card disconnects a communication connection with the first network-side device within at least a target time period is determined based on the first auxiliary information.

In an embodiment, the first SIM card may send the first auxiliary information to the first network-side, and indicate to the first network-side device the reason why the first SIM card disconnects the communication connection with the first network-side device within at least the target time period through the first auxiliary information. So that the first network-side device clearly determines that the first SIM card actively disconnects the communication connection with the first network-side device, and is not due to the communication problem, thereby not performing the action of improving the transmitting power or improving the paging frequency that is configured to solve the communication problem, which avoids waste of resources of the first network-side device.

The target time period may be a duration required from establishing a communication connection between the second SIM card and the second network-side device to completing establishment of the communication connection between the second SIM card and the first network-side device.

Figure 9:
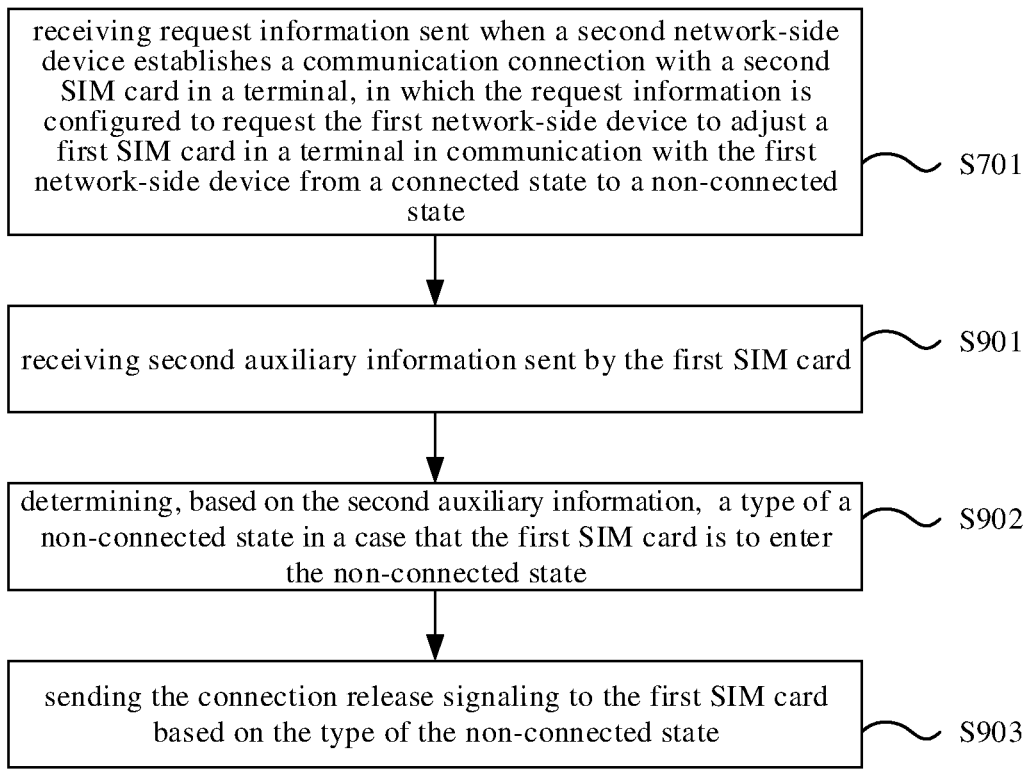
FIG. 9 is a flowchart illustrating a method for connection control according to another embodiment of the present disclosure.

FIG. 9 is a flowchart illustrating a method for connection control according to an embodiment of the present disclosure. As illustrated in FIG. 9, the method further includes:

At step S901, second auxiliary information sent by the first SIM card is received.

At step S902, a type of a non-connected state in a case of determining that the first SIM card is to enter the non-connected state is determined based on the second auxiliary information.

Sending the connection release signaling to the first SIM card includes step S903.

At step S903, the connection release signaling is sent to the first SIM card based on the type of the non-connected state.

In an embodiment, the first SIM card may further send the second auxiliary information to the first network-side device before disconnecting the communication connection with the first network-side device, to indicate to the first network-side device the type of the non-connected state when the first SIM card is to enter the non-connected state through the second auxiliary information. Accordingly, the first network-side device may send a signaling corresponding to the type of the non-connected state to the first SIM card, to indicate the first SIM card to enter the non-connected state that the first SIM card is to enter.

Optionally, the type of the non-connected state includes at least one of:

an idle state or an inactive state.

For example, when the first network-side device determines that the type of the non-connected state that the first SIM card is to enter is the idle state based on the second auxiliary information, an RRC connection release signaling may be sent to the first SIM card, so that the first SIM card enters the idle state. For example, when the first network-side device determines that the type of the non-connected state that the first SIM card is to enter is the inactive state based on the second auxiliary information, an RRC connection suspension release signaling may be sent to the first SIM card, so that the first SIM card enters the inactive state.

Figure 10:
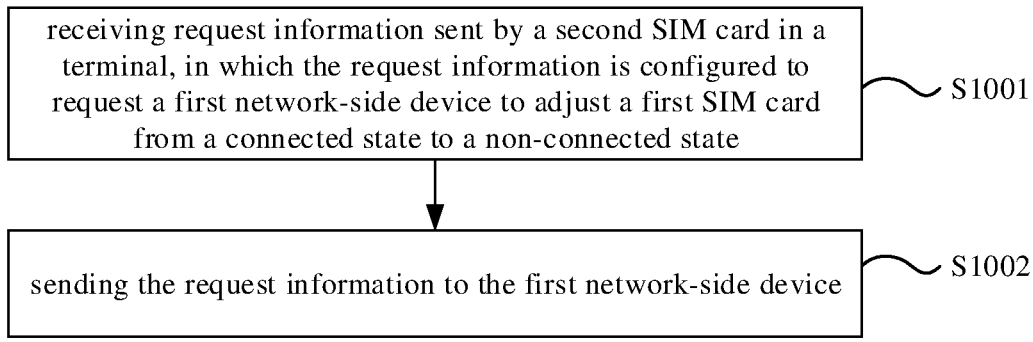
FIG. 10 is a flowchart illustrating a method for connection control according to an embodiment of the present disclosure.

FIG. 10 is a flowchart illustrating a method for connection control according to an embodiment of the present disclosure. The method for connection control as illustrated in embodiments is performed by a second network-side device. The second network-side device may be a base station or a core network, including, but not limited to, a 4G base station, a 5G base station or a 6G base station. The second network-side device may communicate with a terminal which acts as a user equipment. The terminal includes, but is not limited to, a mobile phone, a tablet computer, a wearable device, a sensor, an Internet of things device and other electronic devices. In an embodiment, the terminal may be a terminal that performs the method for connection control as described in the any of the above embodiments.

As illustrated in FIG. 10, the method for connection control includes the following steps.

At step S1001, request information sent by a second SIM card in a terminal is received. The request information is configured to request a first network-side device to adjust a first SIM card from a connected state to a non-connected state.

At step S1002, the request information is sent to the first network-side device.

According to embodiments of the present disclosure, the second SIM card may send the request information to the second network-side device when successfully establishing a communication connection with the second network-side device, and the second network-side device is requested to adjust the first SIM card from the connected state to the non-connected state based on the request information sent by the second SIM card.

Accordingly, it may be ensured that the first SIM card is adjusted from the connected state to the non-connected state when the communication connection between the second SIM card and the second network-side device is successfully established, so that there is a communication connection between at least one SIM card in the terminal and a network-side device, thereby ensuring the communication efficiency of the terminal.

Figure 11:
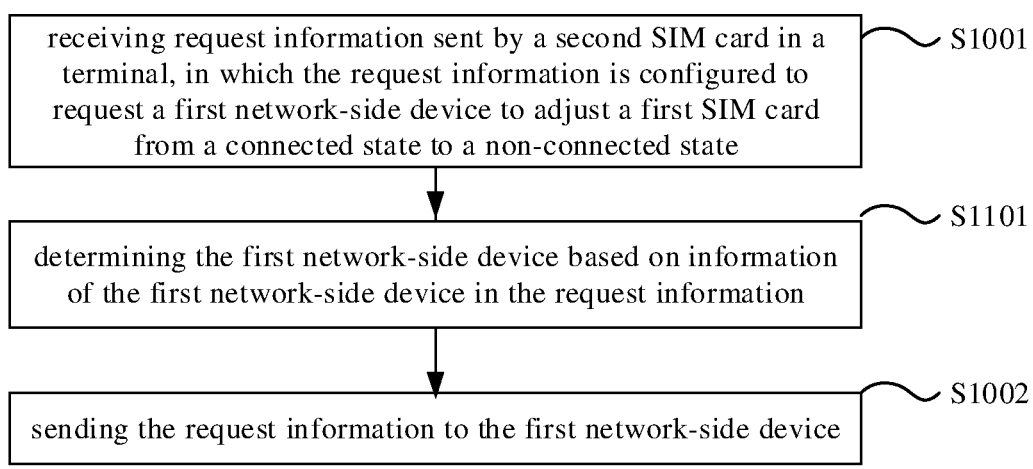
FIG. 11 is a flowchart illustrating a method for connection control according to another embodiment of the present disclosure.

FIG. 11 is a flowchart illustrating a method for connection control according to an embodiment of the present disclosure. As illustrated in FIG. 11, the method further includes:

At step S1101, the first network-side device is determined based on information of the first network-side device in the request information.

In an embodiment, the request information may further include information of the first network-side device such as an identity, a location and an interface type of the first network-side device, so that the second network-side device may determine the first network-side device based on the information of the first network-side device, and further request the first network-side device to send a signaling to the first SIM card, to indicate the first SIM card to enter the non-connected state from the connected state.

Figure 12:
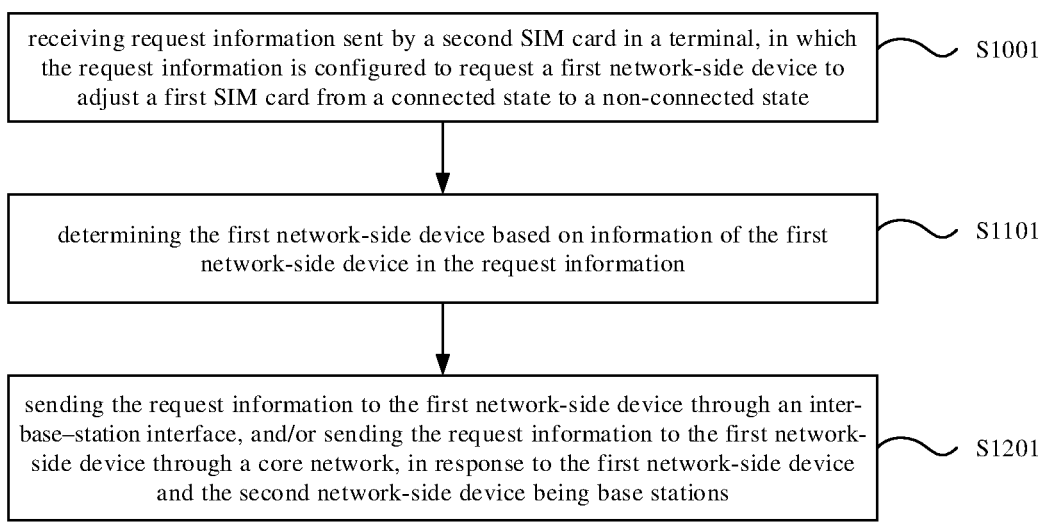
FIG. 12 is a flowchart illustrating a method for connection control according to another embodiment of the present disclosure.

FIG. 12 is a flowchart illustrating a method for connection control according to an embodiment of the present disclosure. As illustrated in FIG. 12, sending the request information to the first network-side device includes:

At step S1201, in response to the first network-side device and the second network-side device being base stations, the request information is sent to the first network-side device through an inter-base-station interface, and/or the request information is sent to the first network-side device through a core network.

In an embodiment, when the first network-side device and the second network-side device are base stations, in a case that the second base station is capable of establishing an interface with the first base station, an interface may be established with the first base station, and the request information may be directly sent to the first base station through the interface, and in a case that the second base station is incapable of establishing an interface with the first base station, the request information may be sent to a core network and then forwarded by the core network to the first base station.

Embodiments of an apparatus for connection control corresponding to the embodiments of the method for connection control are further provided in the present disclosure.

Figure 13:
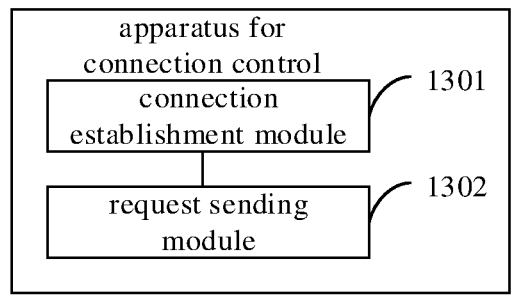
FIG. 13 is a block diagram illustrating an apparatus for connection control according to an embodiment of the present disclosure.

FIG. 13 is a block diagram illustrating an apparatus for connection control according to an embodiment of the present disclosure. The apparatus for connection control as illustrated in the embodiment may be implemented by a terminal. The terminal includes, but is not limited to, a mobile phone, a tablet computer, a wearable device, a sensor, an Internet of things device and other electronic devices. The terminal acting as a user equipment (UE) may communicate with a network-side device, the network-side device including but not limited to a 4G base station, a 5G base station and a 6G base station. In an embodiment, the network-side device may be a network-side device by which the apparatus for connection control as described in any subsequent embodiment is implemented.

The terminal may be a multi-card terminal, that is, more than one SIM card may be configured in the terminal. The more than one SIM card at least includes a first SIM card and a second SIM card. The first SIM card and the second SIM card may belong to the same operator network or different operator networks. When the first SIM card and the second SIM card belong to the same operator network, a first network-side device that establishes a communication connection with the first SIM card may be same as or different from a second network-side device that establishes a communication connection with the second SIM card.

As illustrated in FIG. 13, the apparatus for connection control includes a connection establishment module 1301 and a request sending module 1302.

The connection establishment module 1301 is configured to determine that a communication connection with a second network-side device is established by the second SIM card during communication between the first SIM card and a first network-side device. The second network-side device is same as or different from the first network-side device.

The request sending module 1302 is configured to send request information to the second network-side device by the second SIM card. The request information is configured to adjust the first SIM card from a connected state to a non-connected state.

Optionally, the request sending module is configured to send the request information to a second base station through a fifth message in a random access process, in which the second network-side device is the second base station.

Optionally, the request sending module is configured to send the request information to a second core network through an attach complete message in an attach process, in which the second network-side device is the second core network.

Optionally, the request information is further configured to indicate information of the first network-side device to the second network-side device.

Figure 14:
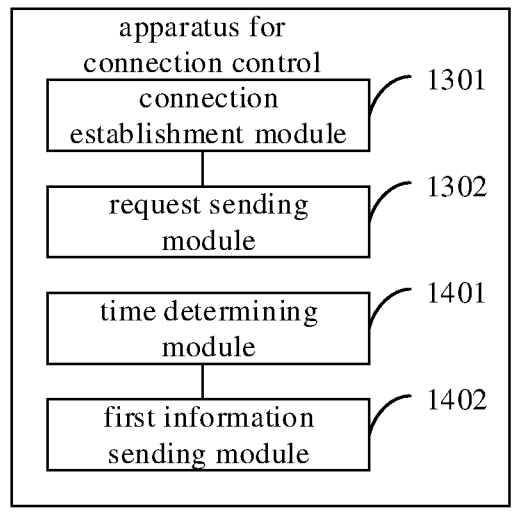
FIG. 14 is a block diagram illustrating an apparatus for connection control according to another embodiment of the present disclosure.

FIG. 14 is a block diagram illustrating an apparatus for connection control according to an embodiment of the present disclosure. As illustrated in FIG. 14, the apparatus further includes a time determining module 1401 and a first information sending module 1402.

The time determining module 1401 is configured to determine a target time period required for establishing a communication connection between the second SIM card and the second network-side device.

The first information sending module 1402 is configured to send first auxiliary information to the first network-side device by the first SIM card. The first auxiliary information is configured to indicate to the first network-side device a reason why the first SIM card disconnects a communication connection with the first network-side device within at least the target time period.

Figure 15:
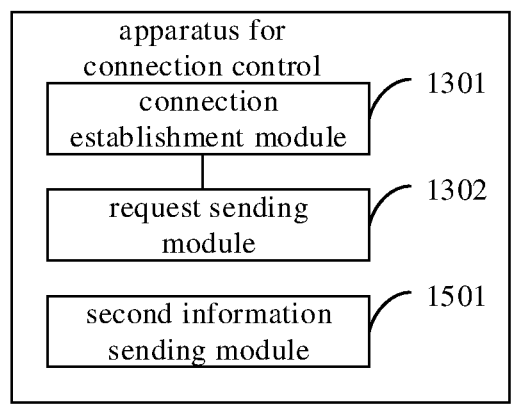
FIG. 15 is a block diagram illustrating an apparatus for connection control according to another embodiment of the present disclosure.

FIG. 15 is a block diagram illustrating an apparatus for connection control according to an embodiment of the present disclosure. As illustrated in FIG. 15, the apparatus further includes a second information sending module 1501.

The second information sending module 1501 is configured to send second auxiliary information to the first network-side device by the first SIM card. The second auxiliary information is configured to indicate to the first network-side device a type of the non-connected state in a case that the first SIM card is to enter the non-connected state.

Optionally, the type of the non-connected state includes at least one of:

an idle state or an inactive state.

Figure 16:
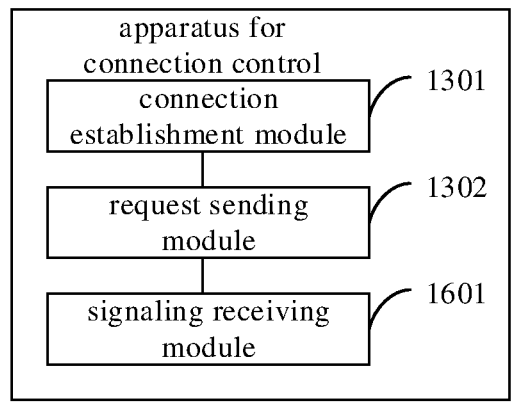
FIG. 16 is a block diagram illustrating an apparatus for connection control according to another embodiment of the present disclosure.

FIG. 16 is a block diagram illustrating an apparatus for connection control according to an embodiment of the present disclosure. As illustrated in FIG. 16, the apparatus further includes a signaling receiving module 1601.

The signaling receiving module 1601 is configured to, when the second SIM card establishes the communication connection with the second network-side device, receive a connection release signaling sent by the first network-side device, and control the first SIM card to enter the non-connected state based on the connection release signaling.

Figure 17:
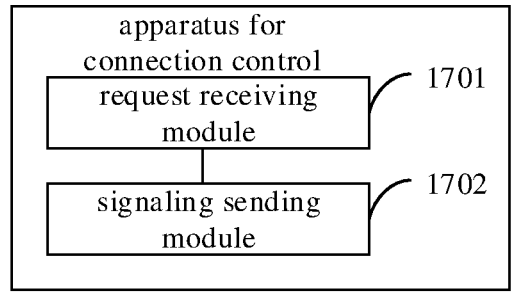
FIG. 17 is a block diagram illustrating an apparatus for connection control according to an embodiment of the present disclosure.

FIG. 17 is a block diagram illustrating an apparatus for connection control according to an embodiment of the present disclosure. The apparatus for connection control as illustrated in embodiments is implemented by a first network-side device. The first network-side device may be a base station or a core network. The base station includes, but is not limited to, a 4G base station, a 5G base station or a 6G base station. The first network-side device may communicate with a terminal acting as a user equipment. The terminal includes, but is not limited to, a mobile phone, a tablet computer, a wearable device, a sensor, an Internet of things device and other electronic devices. In an embodiment, the terminal may be a terminal by which the apparatus for connection control as described in the any embodiment is implemented.

As illustrated in FIG. 17, the apparatus for connection control includes a request receiving module 1701 and a signaling sending module 1702.

The request receiving module 1701 is configured to receive request information sent when a second network-side device establishes a communication connection with a second SIM card in a terminal. The request information is configured to request the first network-side device to adjust a first SIM card in the terminal in communication with the first network-side device from a connected state to a non-connected state.

The signaling sending module 1702 is configured to send a connection release signaling to the first SIM card.

Figure 18:
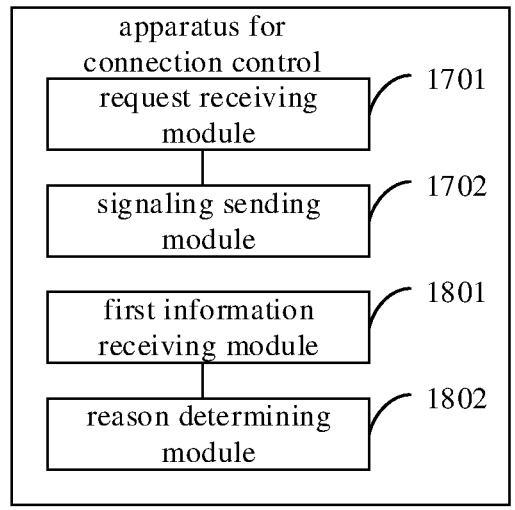
FIG. 18 is a block diagram illustrating an apparatus for connection control according to another embodiment of the present disclosure.

FIG. 18 is a block diagram illustrating an apparatus for connection control according to an embodiment of the present disclosure. As illustrated in FIG. 18, the apparatus further includes a first information receiving module 1801 and a reason determining module 1802.

The first information receiving module 1801 is configured to receive first auxiliary information sent by the first SIM card.

The reason determining module 1802 is configured determine, based on the first auxiliary information, a reason why the first SIM card disconnects a communication connection with the first network-side device within at least the target time period.

Figure 19:
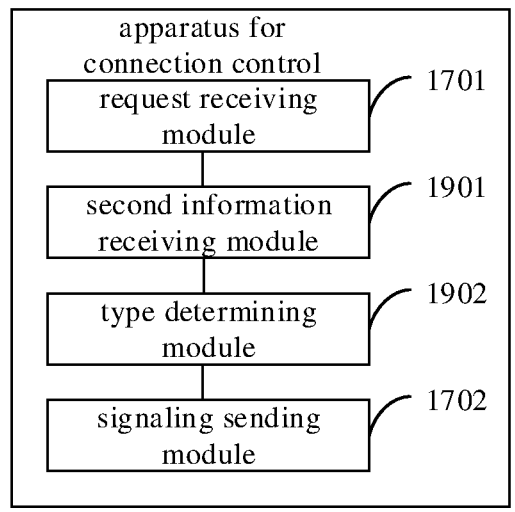
FIG. 19 is a block diagram illustrating an apparatus for connection control according to another embodiment of the present disclosure.

FIG. 19 is a block diagram illustrating an apparatus for connection control according to an embodiment of the present disclosure. As illustrated in FIG. 19, the apparatus further includes a second information receiving module 1901 and a type determining module 1902.

The second information receiving module 1901 is configured to receive second auxiliary information sent by the first SIM card.

The type determining module 1902 is configured to determine, based on the second auxiliary information, a type of the non-connected state in a case that the first SIM card is to enter the non-connected state.

The signaling sending module 1702 is configured to send a connection release signaling to the first SIM card based on the type of the non-connected state.

In at least one embodiment, the type of the non-connected state includes at least one of:

an idle state or an inactive state.

Figure 20:
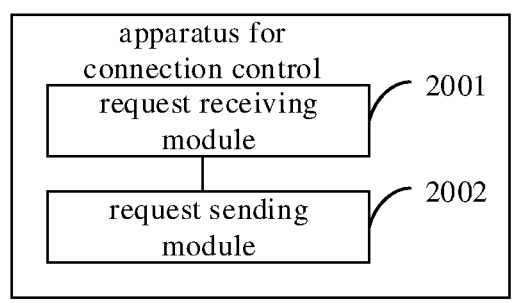
FIG. 20 is a block diagram illustrating an apparatus for connection control according to an embodiment of the present disclosure.

FIG. 20 is a block diagram illustrating an apparatus for connection control according to an embodiment of the present disclosure. The apparatus for connection control as illustrated in embodiments is implemented by a second network-side device. The second network-side device may be a base station or a core network. The base station includes, but is not limited to, a 4G base station, a 5G base station or a 6G base station. The second network-side device may communicate with a terminal acting as a user equipment. The terminal includes, but is not limited to, a mobile phone, a tablet computer, a wearable device, a sensor, an Internet of things device and other electronic devices. In an embodiment, the terminal may be a terminal by which the apparatus for connection control as described in the any embodiment is implemented.

As illustrated in FIG. 20, the apparatus for connection control includes a request receiving module 2001 and a request sending module 2002.

The request receiving module 2001 is configured to receive request information sent by a second SIM card in a terminal. The request information is configured to request a first network-side device to adjust a first SIM card from a connected state to a non-connected state.

The request sending module 2002 is configured to send the request information to the first network-side device.

Figure 21:
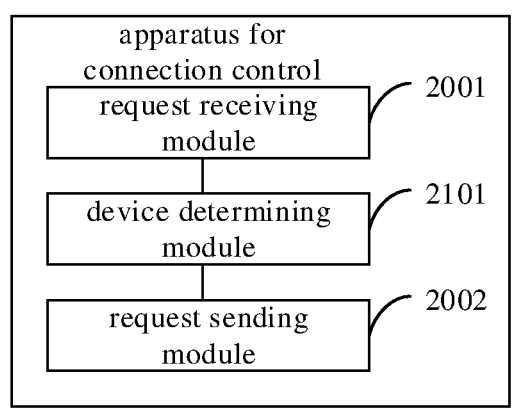
FIG. 21 is a block diagram illustrating an apparatus for connection control according to another embodiment of the present disclosure.

FIG. 21 is a block diagram illustrating an apparatus for connection control according to an embodiment of the present disclosure. As illustrated in FIG. 20, the apparatus further includes a device determining module 2101.

The device determining module 2101 is configured to determine the first network-side device based on information of the first network-side device in the request information.

Optionally, the request sending module is configured to send the request information to the first network-side device through an inter-base—station interface, and/or sending the request information to the first network-side device through a core network, in response to the first network-side device and the second network-side device being base stations.

With regard to the apparatus in the above embodiments, the specific way in which each module performs its operation has been described in detail in the embodiments of the relevant method and will not be described in detail here.

The apparatus embodiments basically correspond to the method embodiments, the related contents can refer to part of the descriptions of the method embodiments. The above-described apparatus embodiments are merely schematic, the modules described above as separate components may or may not be physically separated, and the components displayed as modules may or may not be physical modules, i.e., the components may be located in one area or may be distributed to multiple network modules. Some or all of these modules can be selected according to practical needs to achieve the purpose of the solution of the disclosure. Those skilled in the art can understand and implement the solution without inventive works.

Embodiments of the present disclosure further provide an electronic device, which includes:

a processor; and a memory configured to store instructions executable by the processor.

The processor is configured to implement the method as described in any of the above embodiments.

Embodiments of the present disclosure further provide a computer-readable storage medium with a computer program stored thereon. The program implements steps of the method as described in any of the above embodiments when executed by the processor.

Figure 22:
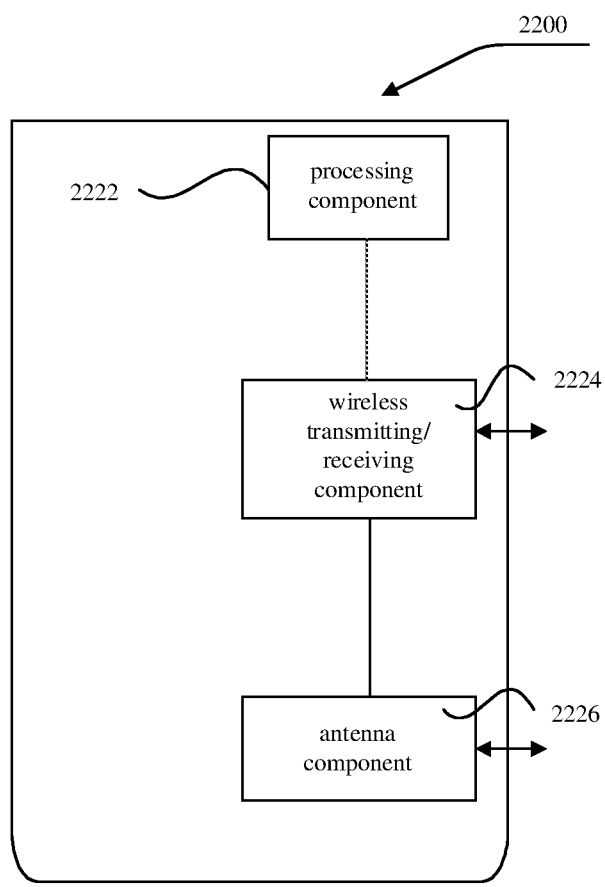
FIG. 22 is a block diagram illustrating a device for connection control according to embodiments of the present disclosure.

As shown in FIG. 22, FIG. 22 is a block diagram illustrating a device 2200 for connection control according to an embodiment of the present disclosure. The device 2200 may be provided as a base station. As illustrated in FIG. 22, the apparatus 2200 includes a processing component 2222, a wireless transmitting/receiving component 2224, an antenna component 2226, and a signal processing unit specific to a wireless interface, and the processing component 2222 may include one or more processors. One processor of the processing component 2222 may be configured to implement the method for connection control in any of the above embodiments.

Figure 23:
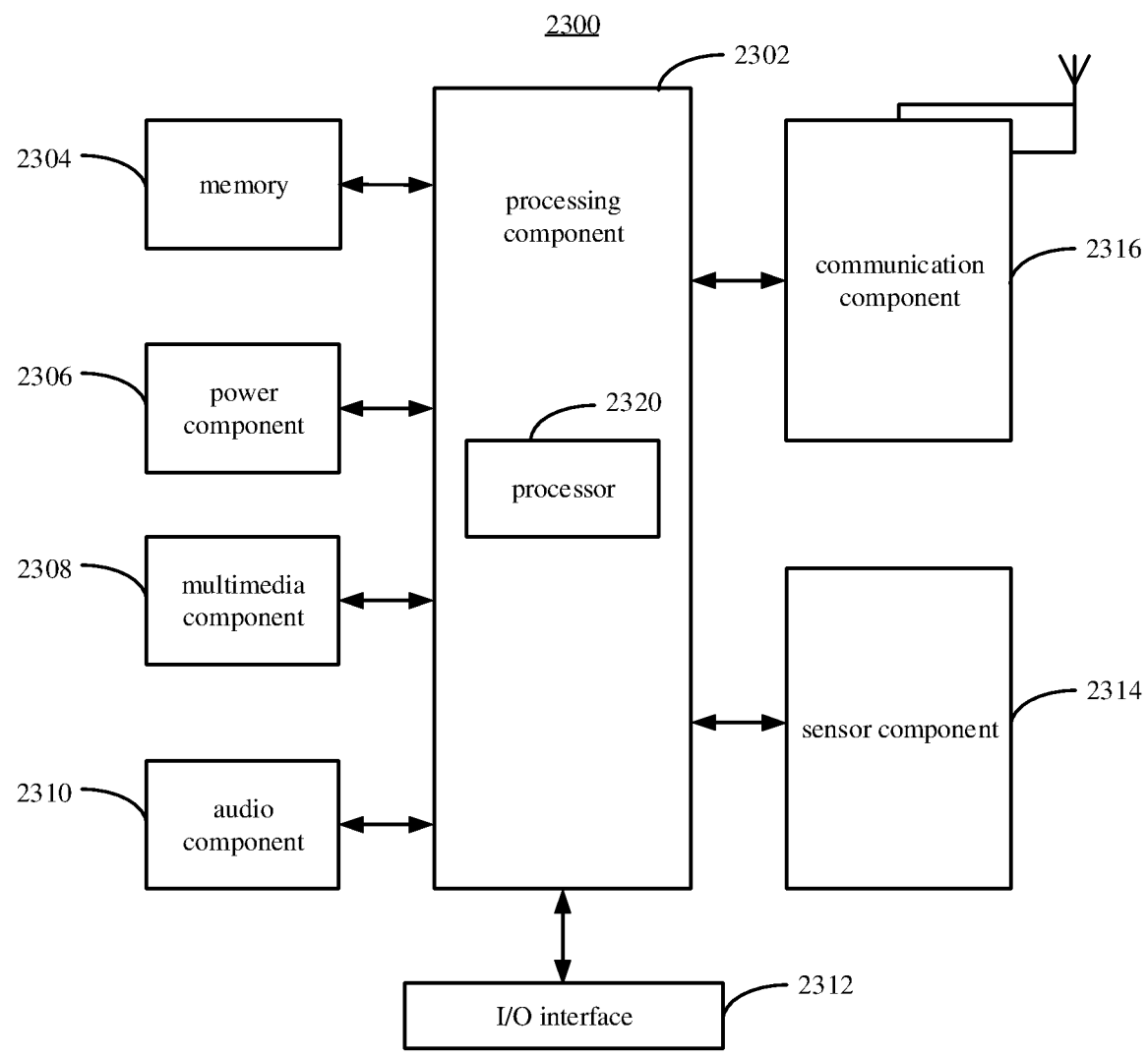
FIG. 23 is a block diagram illustrating a device for connection control according to embodiments of the present disclosure.

FIG. 23 is a block diagram illustrating a device 2300 for connection control according to an embodiment of the present disclosure. For example, the device 2300 may be a mobile phone, a computer, a digital broadcasting terminal, a message transceiver device, a game console, a tablet device, a medical device, a fitness device, a personal digital assistant, etc.

As illustrated FIG. 23, the device 2300 may include one or more of the following components: a processing component 2302, a memory 2304, a power component 2306, a multimedia component 2308, an audio component 2310, an input/output (I/O) interface 2312, a sensor component 2314, and a communication component 2316.

The processing component 2302 generally controls overall operations of the device 2300, such as the operations related to display, phone calls, data communication, camera operations and recording operations. The processing component 2302 may include one or more processors 2320 to perform instructions, to complete all or part of steps of the above method. In addition, the processing component 2302 may include one or more modules for the convenience of interaction between the processing component 2302 and other components. For example, the processing component 2302 may include a multimedia module for the convenience of interaction between the multimedia component 2308 and the processing component 2302.

The memory 2304 is configured to store various types of data to support the operations of the device 2300. Examples of the data include the instructions of any applications or methods operated on the device 2300, contact data, phone book data, messages, pictures, videos, etc. The memory 2304 may be implemented by any type of volatile or non-volatile storage devices or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 2306 may provide power supply for various components of the device 2300. The power component 2306 may include a power management system, one or more power sources, and other components related to generation, management, and distribution of power in the device 2300.

The multimedia component 2308 includes a screen providing an output interface between the device 2300 and the user. In some embodiments, the screen may include a liquid crystal display (LCD) and a touch panel (TP). When the screen includes the touch panel, the screen may be implemented as a touch screen to receive input signals from the user. The touch panel includes one or more touch sensors to sense touches, slides and gestures on the touch panel. The touch sensors may not only sense a boundary of a touch or a slide action, but also detect a duration and a pressure related to the touch or slide operation. In some embodiments, the multimedia component 2308 includes a front camera and/or a rear camera. When the device 2300 is in an operation mode, such as a shooting mode or a video mode, the front camera or the rear camera may receive external multimedia data. Each front camera and rear camera may be a fixed optical lens system or has a focal length and an optical zoom capacity.

The audio component 2310 is configured to output and/or input audio signals. For example, the audio component 2310 includes a microphone (MIC). When the device 2300 is in an operation mode, such as a call mode, a record mode, and a speech recognition mode, the microphone is configured to receive the external audio signals. The audio signals received may be further stored in the memory 2304 or sent via the communication component 2316. In some embodiments, the audio component 2310 further includes a speaker configured to output an audio signal.

The I/O interface 2312 provides an interface between the processing component 2302 and the peripheral interface module, and the peripheral interface module may be a keyboard, a click wheel, a button, etc. The button may include, but is not limited to, a home button, a volume button, a start button and a lock button.

The sensor component 2314 includes one or more sensors, configured to provide status assessment of various aspects of for the device 2300. For example, the sensor component 2314 may detect the on/off state of the device 2300 and the relative positioning of the components. For example, the components are a display and a keypad of the device 2300. The sensor component 2314 may further detect the location change of the device 2300 or a component of the device 2300, the presence or absence of contact between the user and the device 2300, the orientation or the acceleration/deceleration of the device 2300, and the temperature change of the device 2300. The sensor component 2314 may include a proximity sensor, which is configured to detect the existence of the objects nearby without any physical contact. The sensor component 2314 may further include a light sensor such as a Complementary Metal Oxide Semiconductor (CMOS) or Charge-Coupled Device (CCD) image sensor, which is configured to use in imaging applications. In some embodiments, the sensor component 2314 may further include an acceleration transducer, a gyroscope sensor, a magnetic sensor, a pressure sensor or a temperature sensor.

The communication component 2316 is configured for the convenience of wire or wireless communication between the device 2300 and other devices. The device 2300 may access wireless networks based on a communication standard, such as WiFi, 2G or 3G, 4G LTE, 5G NR or their combinations. In an exemplary embodiment, the communication component 2316 receives broadcast signals or broadcast-related information from an external broadcast management system via a broadcast channel In an exemplary embodiment, the communication component 2316 further includes a near field communication (NFC) module to facilitate short-range communication. For example, an NFC module may be implemented based on a radio frequency identification (RFID) technology, an infrared data association (IRDA) technology, an ultra-wideband (UWB) technology, bluetooth (BT) technology and other technologies.

In an exemplary embodiment, the device 2300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components, which is configured to perform the above method.

In an exemplary embodiment, a non-transitory computer readable storage medium is further provided which includes instructions, such as the memory 2304 including instructions. The instructions may be executed by the processor 2320 of the device 2300 to complete the above methods. For example, the non-transitory computer-readable storage medium may be a ROM, a random access memory (RAM), a CD-ROM, a magnetic tape, a floppy disk, an optical data storage device, etc.

After considering the specification and practicing the disclosure herein, those skilled in the art will easily think of other embodiments of the present application. The present application is intended to cover any variations, usages, or adaptive changes of the present application. These variations, usages, or adaptive changes follow the general principles of the present application and include common knowledge or conventional technical means in the technical field not disclosed by the present application. The description and the embodiments are to be regarded as exemplary only, and the true scope and spirit of the present application are given by the appended claims.

It should be understood that the present disclosure is not limited to the precise structure described above and shown in the drawings, and various modifications and changes may be made without departing from its scope. The scope of the present application is only limited by the appended claims.

It should be noted that relational terms such as first and second are used herein to distinguish one entity or operation from another entity or operation, which, however do not necessarily require or imply that there should be any real relationship or sequence. The terms "comprise", "include" or any other variations thereof, are intended to cover a non-exclusive inclusion, such that a process, a method, an article or a device including a series of elements does not only include those elements, but also includes other elements not expressly listed, or may further include elements inherent to such process, method, article, or device. In the absence of more constraints, the elements defined by a statement "comprising a" do not exclude the presence of additional identical elements in the process, method, article, or device that includes the elements.

The method and apparatus of the embodiments of the disclosure have been described in detail above, and specific examples are applied in the disclosure to illustrate principles and implementations of the present disclosure. The descriptions of the above embodiments are only configured to help understand the method and core ideas of the present disclosure. Meanwhile, for those skilled in the art, there may be changes in the specific implementation and application scope according to the idea of the present disclosure. In summary, the contents of the summary should not be construed as a limitation of the present disclosure.

The invention claimed is:

1. A method for connection control, performed by a terminal provided with a first Subscriber Identity Module (SIM) card and a second SIM card, the method comprising:
   determining that a communication connection with a second network-side device is established by the second SIM card during communication between the first SIM card and a first network-side device, wherein the second network-side device is same as or different from the first network-side device;
   sending request information to the second network-side device by the second SIM card, wherein the request information is carried in a fifth message (MSG5) in a random access process or an attach complete message, and the request information is configured to request to adjust the first SIM card from a connected state to a non-connected state based on the second SIM card successfully establishing a communication connection with the second network-side device;
   determining a target time period required for establishing the communication connection between the second SIM card and the second network-side device; and
   sending first auxiliary information to the first network-side device by the first SIM card, wherein the first auxiliary information is configured to indicate to the first network-side device a reason why the first SIM card disconnects a communication connection with the first network-side device after at least the target time period, wherein the reason comprises that the first SIM card actively disconnects the communication connection with the first network-side device.

2. The method according to claim 1, wherein sending the request information to the second network-side device by the second SIM card comprises:
   sending the request information to a second base station through the MSG5 in the random access process, wherein the second network-side device is the second base station.

3. The method according to claim 1, wherein sending the request information to the second network-side device by the second SIM card comprises:
   sending the request information to a second core network through the attach complete message in an attach process, wherein the second network-side device is the second core network.

4. The method according to claim 1, wherein the request information is further configured to indicate information of the first network-side device to the second network-side device.

5. The method according to claim 1, further comprising:
   sending second auxiliary information to the first network-side device by the first SIM card, wherein the second auxiliary information is configured to indicate to the first network-side device a type of a non-connected state in a case that the first SIM card is to enter the non-connected state.

6. The method according to claim 5, wherein the type of the non-connected state comprises at least one of:
   an idle state or an inactive state.

7. The method according to claim 1, further comprising:
   receiving a connection release signaling sent by the first network-side device when the second SIM card establishes the communication connection with the second network-side device, and controlling the first SIM card to enter the non-connected state based on the connection release signaling.

8. A terminal, comprising:
   a processor; and
   a memory configured to store instructions executable by the processor;
   wherein the processor is configured to perform the method according to claim 1.

9. A non-transitory computer-readable storage medium having stored thereon a computer program that, when executed by a processor, causes the processor to perform the method according to claim 1.

10. The method according to claim 4, wherein the information of the first network-side device is acquired by the first SIM card, and the information of the first network-side device is sent to the second SIM card by the first SIM card; or,
    the information of the first network-side device is acquired by the first SIM card, the information of the first network-side device is stored in a processor of the terminal, and the second SIM card acquires the information of the first network-side device from the processor of the terminal.

11. The method according to claim 1, wherein the reason comprises that the first SIM card actively disconnects the communication connection with the first network-side device to ensure that the second SIM card establishes the communication connection with the second network-side device.

12. A method for connection control, performed by a first network-side device, the method comprising:
    receiving second request information sent, based on first request information of a terminal, by a second network-side device, wherein the first request information is carried in a fifth message (MSG5) in a random access process or an attach complete message, and the first request information is configured to request to adjust a first Subscriber Identity Module (SIM) card in the terminal in communication with the first network-side device from a connected state to a non-connected state based on a second SIM card in the terminal successfully establishing a communication connection with the second network-side device; and the second request information is configured to request the first network-side device to adjust the first SIM card in the terminal in communication with the first network-side device from a connected state to a non-connected state;

sending a connection release signaling to the first SIM card;

receiving first auxiliary information sent by the first SIM card; and determining, based on the first auxiliary information, a reason why the first SIM card disconnects a communication connection with the first network-side device after at least a target time period, wherein the reason comprises that the first SIM card actively disconnects the communication connection with the first network-side device.

13. The method according to claim 12, further comprising:

receiving second auxiliary information sent by the first SIM card; and determining, based on the second auxiliary information, a type of a non-connected state, wherein the first SIM card is to enter the non-connected state;

wherein sending the connection release signaling to the first SIM card comprises:

sending the connection release signaling to the first SIM card based on the type of the non-connected state.

14. The method according to claim 13, wherein the type of the non-connected state comprises at least one of:

an idle state or an inactive state.

15. A network device, comprising:

a processor; and a memory configured to store instructions executable by the processor;

wherein the processor is configured to perform the method according to claim 12.

16. A non-transitory computer-readable storage medium having stored thereon a computer program that, when executed by a processor, causes the processor to perform the method according to claim 12.

17. A method for connection control, performed by a second network-side device, the method comprising:

receiving first request information sent by a second Subscriber Identity Module (SIM) card in a terminal, wherein, the first request information is carried in a fifth message (MSG5) in a random access process or an attach complete message, and the first request information is configured to request to adjust a first SIM card in the terminal from a connected state to a non-connected state based on the second SIM card successfully establishing a communication connection with the second network-side device; and sending second request information to a first network-side device; wherein the second request information is configured to request the first network-side device to adjust the first SIM card in the terminal in communication with the first network-side device from a connected state to a non-connected state;

wherein the first SIM card disconnects a communication connection with the first network-side device after at least a target time period, wherein the target time period is a time period required for establishing the communication connection between the second SIM card and the second network-side device; wherein first auxiliary information is sent to the first network-side device by the first SIM card, the first auxiliary information is configured to indicate to the first network-side device a reason why the first SIM card disconnects the communication connection with the first network-side device after at least the target time period, wherein the reason comprises that the first SIM card actively disconnects the communication connection with the first network-side device.

18. The method according to claim 17, further comprising:

determining the first network-side device based on information of the first network-side device in the first request information.

19. The method according to claim 17, wherein sending the second request information to the first network-side device comprises at least one of:

sending the second request information to the first network-side device through an inter-base-station interface, or sending the second request information to the first network-side device through a core network, wherein the first network-side device and the second network-side device are base stations.

20. A network device, comprising:

a processor; and a memory configured to store instructions executable by the processor;

wherein the processor is configured to perform the method according to claim 17.

* * * * *